US012640563B2

(12) United States Patent
Song et al.

(10) Patent No.: US 12,640,563 B2
(45) Date of Patent: May 26, 2026

(54) ELECTRONIC APPARATUS AND CONTROL METHOD THEREOF

(71) Applicant: SAMSUNG ELECTRONICS CO., LTD., Suwon-si (KR)

(72) Inventors: Hyungseon Song, Suwon-si (KR); Jooyoo Kim, Suwon-si (KR); Kyungjae Kim, Suwon-si (KR); Jongyoub Ryu, Suwon-si (KR); Dongjun Shin, Suwon-si (KR); Miyoung Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 519 days.

(21) Appl. No.: 18/134,346

(22) Filed: Apr. 13, 2023

(65) Prior Publication Data

US 2023/0253791 A1     Aug. 10, 2023

Related U.S. Application Data

(63) Continuation of application No. PCT/KR2022/019547, filed on Dec. 2, 2022.

(30) Foreign Application Priority Data

Jan. 28, 2022    (KR) ........................ 10-2022-0013581

(51) Int. Cl.
*H02J 3/00* (2026.01)
*H02J 103/30* (2026.01)
(Continued)

(52) U.S. Cl.
CPC ........... *H02J 3/004* (2020.01); *H02J 2103/30* (2026.01); *H02J 2105/42* (2026.01); *H02J 2105/61* (2026.01)

(58) Field of Classification Search
CPC .... H02J 2310/70; H02J 3/004; H02J 2203/20; H02J 2310/14; G06Q 50/06; G06Q 10/04; G06Q 50/10; G06N 3/02
See application file for complete search history.

(56) References Cited

U.S. PATENT DOCUMENTS 9,423,432 B2    8/2016   Silveira Filho et al.
9,722,668 B2    8/2017   Ha et al.
(Continued)

FOREIGN PATENT DOCUMENTS

CN          104092775 A     10/2014
JP        2010218077 A *   9/2010
(Continued)

OTHER PUBLICATIONS

International Search Report by the International Searching Authority (PCT/ISA/210) issued on Mar. 21, 2023 for International Patent Application No. PCT/KR2022/019547.
(Continued)

*Primary Examiner* — Mohammad Ali
*Assistant Examiner* — Dhruvkumar Patel
(74) *Attorney, Agent, or Firm* — Sughrue Mion, PLLC

(57) ABSTRACT

In an electronic apparatus, reference information stored on a memory includes standard appliance ownership information describing owned home appliances of at least one standard household and standard monthly power consumption information of the standard household. A processor obtains first monthly power consumption information of a first household which owns a first home appliance of a same type as a standard home appliance described in the standard appliance ownership information. Based on a difference between the standard and first monthly power consumption information being within a threshold range, the processor compares appliance monthly power consumption informa-
(Continued)

tion of the standard home appliance and of the first home appliance, and, based on the result being within a threshold range, predicts first appliance ownership information on owned home appliances of the first household based on the standard appliance ownership information. The processor then provides guide information associated with the first appliance ownership information.

18 Claims, 12 Drawing Sheets

(51) Int. Cl.
    *H02J 105/00*          (2026.01)
    *H02J 105/42*          (2026.01)

(56)                References Cited

U.S. PATENT DOCUMENTS

| | | | |
|---|---|---|---|
| 11,038,350 | B2 | 6/2021 | Han et al. |
| 2012/0065792 | A1* | 3/2012 | Yonezawa ............... H02J 3/003 |
| | | | 700/291 |
| 2012/0123995 | A1* | 5/2012 | Boot ................ H02J 13/00004 |
| | | | 706/54 |
| 2013/0035884 | A1* | 2/2013 | Burke ............... H02J 13/00004 |
| | | | 702/61 |

| | | | |
|---|---|---|---|
| 2014/0129160 | A1* | 5/2014 | Tran ........................ G01W 1/00 |
| | | | 702/61 |
| 2014/0300450 | A1 | 10/2014 | Ha et al. |
| 2015/0256032 | A1* | 9/2015 | Gatto ............... H02J 13/00006 |
| | | | 307/35 |
| 2017/0011304 | A1 | 1/2017 | Shimizu |
| 2018/0254634 | A1 | 9/2018 | Han et al. |

FOREIGN PATENT DOCUMENTS

| | | | | |
|---|---|---|---|---|
| JP | 5484510 | B2 | 5/2014 | |
| JP | 6168456 | B2 | 7/2017 | |
| KR | 10-0400459 | B1 | 10/2003 | |
| KR | 101145319 | B1 * | 5/2012 | ............ G01R 22/06 |
| KR | 10-2016-0119893 | A | 10/2016 | |
| KR | 10-2017-0116306 | A | 10/2017 | |
| KR | 10-2019-0041260 | A | 4/2019 | |
| KR | 10-2051369 | B1 | 12/2019 | |
| KR | 10-2021-0102519 | A | 8/2021 | |

OTHER PUBLICATIONS

Written Opinion by the International Searching Authority (PCT/ISA/237) issued on Mar. 21, 2023 for International Patent Application No. PCT/KR2022/019547.

* cited by examiner

<u>100</u>

110 120

500

<HOUSEHOLD POWER CONSUMPTION>

600

<WASHER POWER CONSUMPTION>

FIG. 11

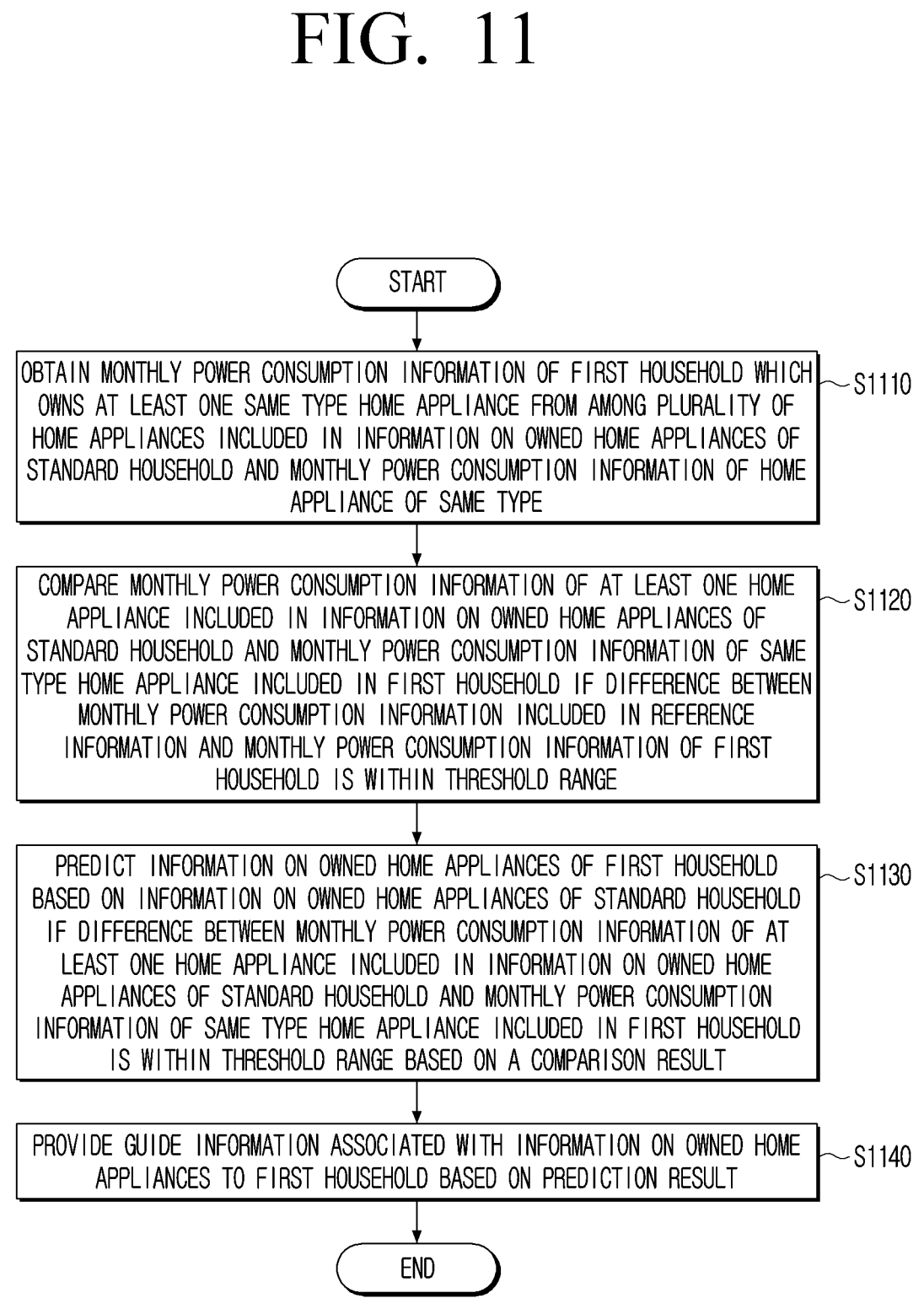

START

OBTAIN MONTHLY POWER CONSUMPTION INFORMATION OF FIRST HOUSEHOLD WHICH OWNS AT LEAST ONE SAME TYPE HOME APPLIANCE FROM AMONG PLURALITY OF HOME APPLIANCES INCLUDED IN INFORMATION ON OWNED HOME APPLIANCES OF STANDARD HOUSEHOLD AND MONTHLY POWER CONSUMPTION INFORMATION OF HOME APPLIANCE OF SAME TYPE — S1110

COMPARE MONTHLY POWER CONSUMPTION INFORMATION OF AT LEAST ONE HOME APPLIANCE INCLUDED IN INFORMATION ON OWNED HOME APPLIANCES OF STANDARD HOUSEHOLD AND MONTHLY POWER CONSUMPTION INFORMATION OF SAME TYPE HOME APPLIANCE INCLUDED IN FIRST HOUSEHOLD IF DIFFERENCE BETWEEN MONTHLY POWER CONSUMPTION INFORMATION INCLUDED IN REFERENCE INFORMATION AND MONTHLY POWER CONSUMPTION INFORMATION OF FIRST HOUSEHOLD IS WITHIN THRESHOLD RANGE — S1120

PREDICT INFORMATION ON OWNED HOME APPLIANCES OF FIRST HOUSEHOLD BASED ON INFORMATION ON OWNED HOME APPLIANCES OF STANDARD HOUSEHOLD IF DIFFERENCE BETWEEN MONTHLY POWER CONSUMPTION INFORMATION OF AT LEAST ONE HOME APPLIANCE INCLUDED IN INFORMATION ON OWNED HOME APPLIANCES OF STANDARD HOUSEHOLD AND MONTHLY POWER CONSUMPTION INFORMATION OF SAME TYPE HOME APPLIANCE INCLUDED IN FIRST HOUSEHOLD IS WITHIN THRESHOLD RANGE BASED ON A COMPARISON RESULT — S1130

PROVIDE GUIDE INFORMATION ASSOCIATED WITH INFORMATION ON OWNED HOME APPLIANCES TO FIRST HOUSEHOLD BASED ON PREDICTION RESULT — S1140

END

ELECTRONIC APPARATUS AND CONTROL METHOD THEREOF

CROSS-REFERENCE TO RELATED APPLICATIONS

This application is a bypass continuation application of International Application No. PCT/KR2022/019547, filed Dec. 2, 2022, which claims priority to Korean Patent Application No. 10-2022-0013581, filed on Jan. 28, 2022, in the Korean Intellectual Property Office, the disclosures of which are incorporated by reference herein in their entireties.

BACKGROUND

1. Field

The disclosure relates to an electronic apparatus and a control method thereof, and more particularly to an electronic apparatus which predicts types and number of home appliances included in a target household and a control method thereof.

2. Description of Related Art

Recently, with the dissemination of the Internet of Things (IoT), electronic apparatuses which obtain information of various types from home appliances for registration in the electronic apparatuses, and which remotely control the registered home appliances, are being increasingly developed and used.

In addition, with electronic apparatuses remotely controlling the registered home appliances, a home energy saving service which reduces power consumption of a household which includes the registered home appliances has also been developed. However, in the case of home appliances which are not registered in the electronic apparatus, there is a disadvantage in that it is not possible for the electronic apparatus to obtain information from the corresponding home appliance or remotely control the home appliance.

For example, if there is a home appliance which is not registered in the electronic apparatus from among the home appliances included in any household, there is the problem of the home energy saving service not being provided smoothly because the electronic apparatus cannot control the corresponding home appliance remotely. Accordingly, there is a demand for an electronic apparatus which predicts types and number of home appliances included in a household and provides various guide information according to a prediction result based on power consumption information of a household and power consumption information of the registered home appliances.

SUMMARY

Aspects of the disclosure are to address at least the above-mentioned problems and/or disadvantages, and to provide an electronic apparatus which predicts types and number of home appliances included in a target household based on reference information of a standard household and power consumption information of the target household, and to provide a control method thereof.

Additional aspects will be set forth in part in the description which follows and, in part, will be apparent from the description, or may be learned by practice of the presented embodiments.

According to an embodiment, an electronic apparatus is provided. The electronic apparatus may include a non-volatile memory electrically configured to store computer program instructions and reference information, and a processor operatively connected to the non-volatile memory. The reference information may include standard appliance ownership information describing owned home appliances of at least one standard household and standard monthly power consumption information of the at least one standard household. The processor may be configured to execute the computer program instructions to obtain first monthly power consumption information of a first household which owns a first home appliance of a same type as at least one standard home appliance from among a plurality of home appliances described in the standard appliance ownership information. The processor may be further configured to execute the computer program instructions to compare, based on a difference between the standard monthly power consumption information and the first monthly power consumption information being within a threshold range, standard appliance monthly power consumption information of the at least one standard home appliance and first appliance monthly power consumption information of the first home appliance. The processor may be further configured to execute the computer program instructions to predict, based on a difference between the standard appliance monthly power consumption information and the first appliance monthly power consumption information being within a threshold range based on a comparison result, first appliance ownership information on owned home appliances of the first household based on the standard appliance ownership information. The processor may be further configured to execute the computer program instructions to provide guide information associated with the first appliance ownership information to the first household based on a prediction result.

According to another embodiment, a control method of an electronic apparatus is provided. The electronic apparatus may store reference information including standard appliance ownership information describing owned home appliances of at least one standard household and standard monthly power consumption information of the at least one standard household. The method may include obtaining first monthly power consumption information of a first household which owns a first home appliance of a same type as at least one standard home appliance from among a plurality of home appliances described in the standard appliance ownership information. The method may further include comparing, based on a difference between the standard monthly power consumption information and the first monthly power consumption information being within a threshold range, standard appliance monthly power consumption information of the at least one standard home appliance and first appliance monthly power consumption information of the first home appliance. The method may further include predicting, based on a difference between the standard appliance monthly power consumption information and the first appliance monthly power consumption information being within a threshold range based on a comparison result, first appliance ownership information on owned home appliances of the first household based on the standard appliance ownership information. The method may further include providing guide information associated with the first appliance ownership information to the first household based on a prediction result.

According to various embodiments of the disclosure, user convenience may be enhanced because guide information of various types for households which include home appliances not registered in an electronic apparatus can be provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a flowchart illustrating a control method according to an embodiment of the disclosure.

DETAILED DESCRIPTION

The disclosure will be described in detail below with reference to the accompanying drawings.

Terms used in describing the embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "configured" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the embodiments herein perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated to at least one module and implemented in at least one processor (not shown).

Figure 1:
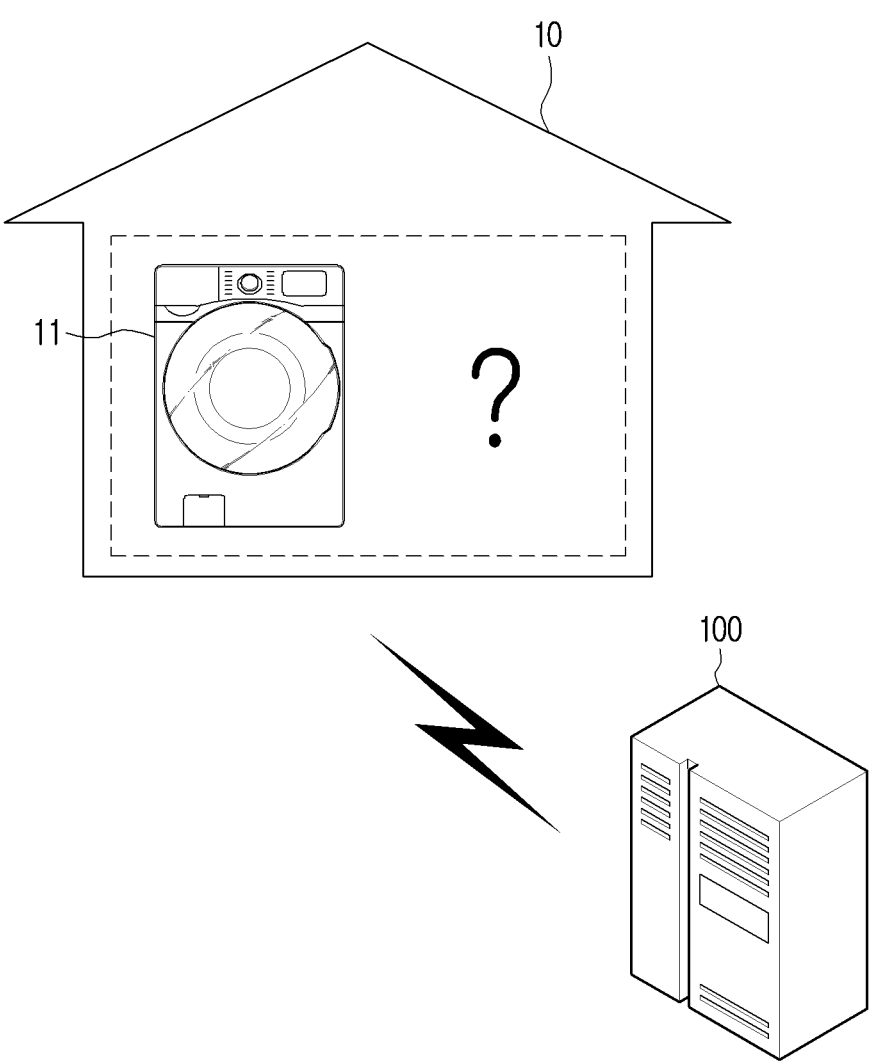
FIG. 1 is a diagram illustrating an example environment for use of an apparatus and method according to an embodiment of the disclosure.

FIG. 1 is a diagram illustrating an example environment for use of an apparatus and method according to an embodiment of the disclosure.

The electronic apparatus 100 may be an apparatus which predicts information on owned home appliances in a household, and may be a server, a television (TV), a desktop personal computer (PC), a notebook, a set top box (STB), a smartphone, a tablet PC, and the like. However, the embodiment is not limited thereto, and the electronic apparatus 100 may be any device as long as it is a device which can predict information on owned home appliances in a household.

A household 10 may be a household owning at least one home appliance 11 and the like. That is, the household 10 contains the at least one home appliance 11 within the property thereof. In embodiments where the electronic apparatus 100 predicts information on owned home appliances in the household 10, the household 10 may be referred to as the 'target household' of the electronic apparatus 100.

In the illustrated example environment, a washer 11 included in the target household 10 may be a home appliance registered in the electronic apparatus 100. However, remaining home appliances excluding the washer 11 may be home appliances which are not registered in the electronic apparatus 100. For example, the washer 11 may be a home appliance manufactured by an entity (e.g., a manufacturer of the home appliance, etc.) which uses the electronic apparatus 100, and the remaining home appliances excluding the washer 11 may be home appliances which are not manufactured by the entity using the electronic apparatus 100. Other household arrangements where some but not all home appliances in the target household 10 are registered in the electronic apparatus 100 are also within the scope of the disclosure.

The electronic apparatus 100 may obtain identification information and power consumption information of the washer 11 and the like from the washer 11, as it is a registered device. However, the electronic apparatus 100 may be unable to obtain information on the remaining home appliances which are unregistered devices.

Therefore, the electronic apparatus 100 may utilize power consumption information of the target household 10 and power consumption information of the registered home appliance 11 to predict types and number of home appliances included in the target household 10. For example, the electronic apparatus 100 may compare monthly power consumptions of a standard household and the target household 10, and compare monthly power consumptions of a washer included in the standard household and the monthly power consumptions of the washer 11 included in the target household 10. In addition, the electronic apparatus 100 may predict types and number of home appliances included in the target household 10 based on a comparison result.

Various embodiments of predicting the types and number of home appliances included in the target household, based on reference information on the standard household and power consumption information on the target household, will be described in greater detail below.

Figure 2:
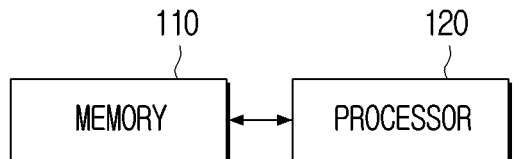
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 may include a memory 110 and a processor 120.

The memory 110 may store necessary data for the various embodiments of the disclosure. The memory 110 may be implemented in the form of a memory embedded in the electronic apparatus 100 according to a data storage use, or in the form of a memory which is detachable from or attachable to the electronic apparatus 100. For example, the data for the driving of the electronic apparatus 100 may be stored in a memory embedded to the electronic apparatus 100, and data for an expansion function of the electronic apparatus 100 may be stored in a memory which is detachable from or attachable to the electronic apparatus 100. The memory embedded in the electronic apparatus 100 may be implemented as at least one from among a volatile memory (e.g., a dynamic RAM (DRAM), a static RAM (SRAM), or a synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash, etc.), a hard disk drive (HDD) or a solid state drive (SSD)). In addition, a memory which is detachable from or attachable to the electronic apparatus 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

In the memory 110 according to an embodiment, at least one instruction or module necessary in an operation of the electronic apparatus 100 or the processor 120 may be stored. Here, the instruction may be a code unit which instructs an operation of the electronic apparatus 100 or the processor 120, and may be written in a mechanical language which is a language understandable by a computer. The module may be an instruction set in series which perform a specific operation of an operation unit.

The memory 110 may be stored with reference information which include information on owned home appliances and power consumption information of a "standard household." Here, the standard household may be a concept which includes a household which can perform as a control group, based on the target household, to predict information on owned home appliances of the target household. For example, the standard household may include a household that includes home appliances registered in the electronic apparatus 100 by a threshold number or more, but is not limited thereto.

Information on owned home appliances of the standard household may include not only information on the types and number of home appliances which are registered and managed in the electronic apparatus 100 from among the home appliances included in each of the standard households, but also information on product names, model names, manufacturers, rated power consumption, and the like of home appliances included in each of the standard households. In addition, information on owned home appliances may include power consumption information of each of the home appliances which are registered and managed in the electronic apparatus 100. For example, in the memory 110, information may be stored that a TV used 35 kWh power and an air conditioner used 87 kWh power in one standard household in December 2021.

Power consumption information of the standard household may be information in which the power consumption information corresponding to each of the standard is stored in pre-set time segment units. The power consumption information of the standard household may be obtained based on an amount of power used which is notified from a power company, and the amount of power used may be a total amount of power used in the household which is measured during a specific period through a smart meter. Alternatively, the amount of power used may be an incremented amount of power used during a specific period from an accumulated amount of power used in the household.

In addition, reference information may include characteristic information of the standard household. Here, characteristic information of the household may be information which includes at least one characteristic from among a number of members in the standard household, a size of a space in the standard household, or a type of the standard household. For example, characteristic information on one household from among the standard households may include information that the number of members in the corresponding household is 4 people, the size of the household space is 85 square meters, and the type of the household is an apartment.

In addition, in the memory 110, at least one neural network model for predicting information regarding the owned home appliances in the target household may be stored.

The processor 120 may control the overall operation of the electronic apparatus 100. Specifically, the processor 120 may be coupled with each configuration of the electronic apparatus 100 and control the overall operation of the electronic apparatus 100. For example, the processor 120 may be coupled with the memory 110 and control an operation of the electronic apparatus 100.

According to an embodiment, the processor 120 may be designated to various names such as, for example, and without limitation, a digital signal processor (DSP), a microprocessor, a central processing unit (CPU), a micro controller unit (MCU), a micro processing unit (MPU), a neural processing unit (NPU), a controller, an application processor (AP), and the like, but will be described as the processor 120 herein.

The processor 120 may be implemented in a form of a system of chip (SoC) and a large scale integration (LSI), and implemented in a form of a field programmable gate array (FPGA). In addition, the processor 120 may include a volatile memory such as a SRAM.

The processor 120 according to an embodiment may obtain monthly power consumption information of the target household which owns a same type home appliances as with at least one from among a plurality of home appliances included in the information on owned home appliances of the standard household and monthly power consumption information of the corresponding home appliance.

For example, the processor 120 may obtain monthly power consumption information of the target household which owns a washer which is a same type home appliance as with the washer included in one standard household. Here, the washer included in the target household may be the home appliance registered in the electronic apparatus 100, and the monthly power consumption information of the target household may be obtained based on an amount of power used which is notified from a power company. In addition, the processor 120 may obtain information on the monthly power consumption of the washer included in the target household.

In addition, the processor 120 may compare the monthly power consumption information of the standard household included in the reference information and the monthly power consumption of the target household. For example, the processor 120 may identify whether a difference between the monthly power consumption information of the standard household and the target household is within a threshold range through a comparison of at least one from among a scale or pattern of the monthly power consumptions of the standard household and the target household.

If the difference between the monthly power consumption information of the standard household and the target household is identified as within the threshold range, the processor 120 may determine that power consumption styles of the standard household and the target household are similar. However, even if the monthly power consumption information of the standard household and the target household are similar, configurations of the home appliance included in each household may still differ. This is because, for example, when a style of a member of each household using the home appliance included in the household is different, despite the configuration of the home appliance included in the standard household and the configuration of the home appliance included in the target household being different, the monthly power consumption information of each household may be identified as similar.

Accordingly, the processor 120 may compare the monthly power consumption information that corresponds to the same type home appliance included in each household in addition to comparing the total power consumption of the standard household and the target household.

Specifically, the processor 120 may compare the monthly power consumption information of at least one home appliance included in the standard household and the monthly power consumption information of the same type home appliance included in the target household. For example, the processor 120 may compare the monthly power consumptions of the washer included in the standard household and the monthly power consumption information of a washer which is the same type home appliance included in the target household.

According to an example, when a difference between the monthly power consumption information of the washer included in the standard household and the washer included in the target household is identified as within a threshold range as a result of comparing based on at least one from among a scale or a pattern of the monthly power consumption corresponding to each of the washers included in the standard household and the target household, the processor 120 may predict information on owned home appliances of the target household based on information on owned home appliances of the standard household.

Because there is a high likelihood of the configuration of the home appliance included in each household being same or similar based on not only total power consumption information of the standard household and the target household being similar, but also even the power consumption information corresponding to the same type home appliance included in each household being similar, the processor 120 may predict that the home appliance included in the standard household, in which the total power consumption information and the power consumption information corresponding to the same type home appliance are all similar with the target household, is also included alike in the target household.

For example, if a washer, a dryer, and an air conditioner are each included in the standard household in which the total power consumption information and the power consumption information corresponding to the same type home appliance are all similar with the target household, the processor 120 may predict that in addition to the washer registered in the electronic apparatus 100, a dryer and an air conditioner, which are unregistered home appliances, are each respectively further included in the target household as well.

The processor 120 may provide guide information associated with information on owned home appliances to the target household based on a prediction result. Here, the guide information may include information associated with the remaining home appliances excluding the home appliance (e.g., washer) registered in the electronic apparatus 100 from among the home appliances included in the target household. For example, the processor 120 may provide guide information which includes at least one from among purchase recommendation information associated with a dryer and an air conditioner, which are the remaining home appliances excluding the washer registered in the electronic apparatus 100 from among the home appliances included in the target household or a power reduction scenario of the target household.

In addition, the processor 120 may identify the standard household which matches the target household based on a priority order allocated to the standard household. To this end, prior to the identification of the standard household which matches with the target household, the processor 120 may allocate a priority order according to a pre-set standard to the standard household.

For example, the processor 120 may allocate a priority order of "first" (e.g. greatest) to the standard household in which there are four or more home appliances registered in the electronic apparatus 100, and allocate a priority order of "second" (e.g. second greatest) to the standard household in which there are three registered home appliances. The processor 120 may first compare the monthly power consumption information of the standard household allocated with the priority order of first and the monthly power consumption information of the target household, and compare the monthly power consumption information of the standard household allocated with the priority order of second and the monthly power consumption information of the target household when there are no households which match with the target household from among the standard households allocated with the priority order of first.

The processor 120 may identify only the household with owned home appliances of a threshold number or more registered in the electronic apparatus 100 as the standard household. For example, the processor 120 may identify only the household in which three or more owned home appliances are registered in the electronic apparatus 100 as the standard household, and not identify the household in which less than three owned home appliances are registered in the electronic apparatus 100 as the standard household.

The processor 120 may also predict information on owned home appliances of the target household which does not own home appliances registered in the electronic apparatus 100.

For example, the processor 120 may obtain the monthly power consumption information of the target household which does not own the home appliances registered in the electronic apparatus 100 and characteristic information of the target household. Here, the characteristic information may be information which includes at least one characteristic from among a number of members in the target household, a size of a space in the target household, or a type of the target household. For example, the characteristic information on the target household may include information that the number of members in the target household is three people, the size of the household space is 85 square meters, and the type of the household is a detached house.

The characteristic information of the target household may be obtained through a survey of one person from among the members of the target household, or obtained based on public information on the target household, but is not limited thereto. According to an example, the processor 120 may obtain the characteristic information of the target household based on statistical data which includes the monthly power consumption information of the target household and the characteristic of the household that corresponds to the monthly power consumption.

The processor 120 may identify the standard household which matches the target household based on the reference information stored in the memory 110, the monthly power consumption information of the target household which does not own home appliances registered in the electronic apparatus 100, and the characteristic information of the target household. For example, the processor 120 may identify a standard household having characteristic information which is most similar with the characteristic information of the target household as the household which matches the target household from among the standard households having monthly power consumption information in which the difference with the monthly power consumption information of the target household is within a threshold range.

Based on not only the power consumption style of the target household and the standard household matched to the target household being similar, but also at least one from among the number of household members, the size of the household space, or the type of the household being similar, the processor 120 may predict information on owned home appliances of the target household based on information on owned home appliances of the standard household matched to the target household because the likelihood of the configurations of the home appliances included in both households also being same or similar is high.

The processor 120 may input the monthly power consumption information of the target household in a trained neural network model and obtain information on owned home appliances of the target household. A function associated with predicting the information on owned home appliances of the target household according to the disclosure may be operated through the processor 120 and the memory 110.

The processor 120 may be configured of one or a plurality of processors. Among configurations of processors presently available and suitable for the disclosed apparatus, the one or plurality of processors 120 may be a generic-purpose processor such as a central processing unit (CPU), an application processor (AP), or a digital signal processor (DSP), a graphics dedicated processor such as a graphics processing unit (GPU) or a vision processing unit (VPU), or an artificial intelligence dedicated processor such as a neural processing unit (NPU). The one or plurality of processors may control so as to process input data according to a pre-defined operation rule or a neural network model stored in the memory 110. Alternatively, if the one or the plurality of processors 120 is an artificial intelligence detected processor, the artificial intelligence detected processor may be designed in a hardware structure specialized in processing of a specific neural network model.

The neural network model is characterized by being created through learning or training. Here, "being created through learning" may refer to the pre-defined operation rule or a neural network model being created which is set to perform a desired characteristic (or, purpose) because a basic neural network model is trained by a learning algorithm using a plurality of learning data. The learning may be carried out in the machine itself in which the artificial intelligence according to the disclosure is performed, or carried out through a separate server and/or system. Examples of the learning algorithm may include a supervised learning, a unsupervised learning, a semi-supervised learning, or a reinforcement learning, but is not limited to the above-described examples.

The neural network model may be configured of a plurality of neural network layers. The each of the plurality of neural network layers may have a plurality of weight values, and may perform neural network processing through processing between a processing result of a previous layer and the plurality of weight values. The plurality of weight values included in the plurality of neural network layers may be optimized by a learning result of the neural network model. For example, the plurality of weight values may be updated for a loss value or a cost value obtained from the neural network model during a learning process to be reduced or minimized. The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but is not limited to the above-described examples.

The neural network model may be stored in the memory 110, but may be used, by the electronic apparatus 100, by downloading the neural network model from an external server (not shown), and the electronic apparatus 100 may transmit input data associated with the neural network model which is stored in the external server to the external server, and predict information one the owned home appliances of the target household based on receiving output data associated with the neural network model from the external server again.

Figure 3:
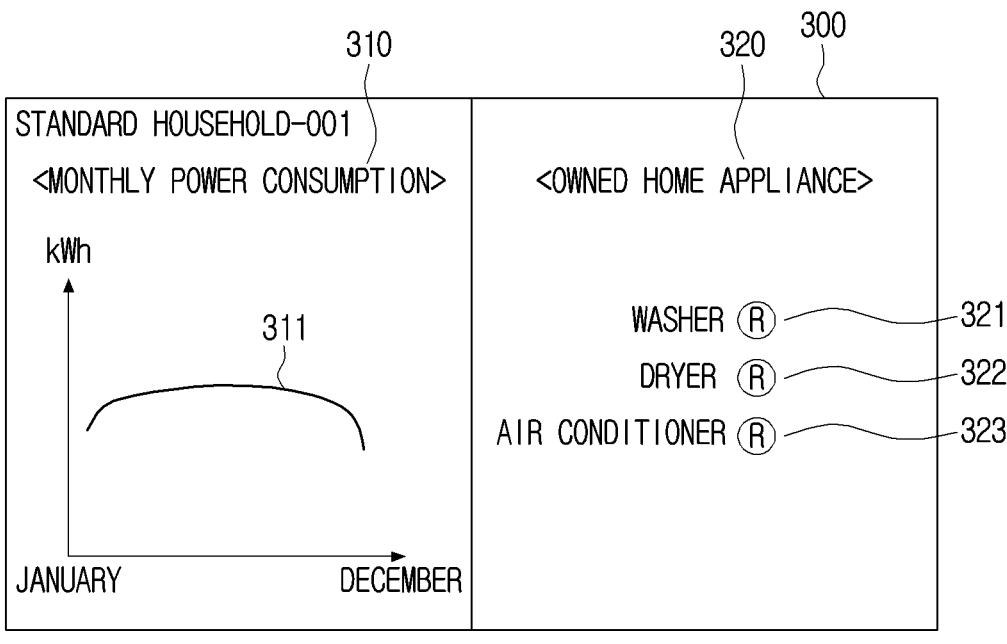
FIG. 3 is a diagram illustrating reference information according to an embodiment of the disclosure.

FIG. 3 is a diagram illustrating reference information according to an embodiment of the disclosure.

Referring to FIG. 3, in the reference information 300 which corresponds to one standard household ("standard household—001"), the monthly power consumption information 310 of one standard household and information on owned home appliances 320 included in one standard household may be included.

The monthly power consumption information 310 of the standard household may include information on the amount of power used corresponding to each month of a year, and the above may be represented in a graph form 311 on a coordinate plane formed along a temporal axis and a power consumption axis, but is not limited thereto.

The information on owned home appliances 320 of the standard household may include information on home appliances 321, 322, and 323 which are registered and managed in the electronic apparatus 100, but is not limited thereto, and information on the home appliances which are not registered in the electronic apparatus 100 may also be included in the information on owned home appliances 320.

In addition, the information on owned home appliances 320 may include the power consumption information of each of the home appliances which are registered and managed in the electronic apparatus 100. For example, in the information on owned home appliances 320, a monthly power consumption information of a washer 321, a monthly power consumption information of a dryer 322, and a monthly power consumption information of an air conditioner 323 may be included.

Figure 4:
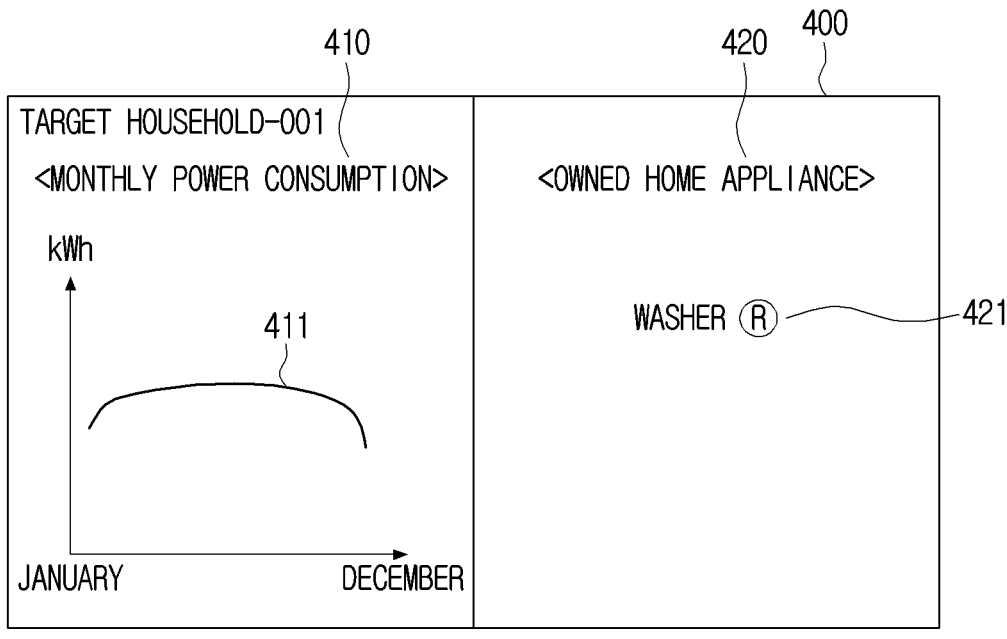
FIG. 4 is a diagram illustrating information on a target household according to an embodiment of the disclosure.

FIG. 4 is a diagram illustrating information on a target household according to an embodiment of the disclosure.

Referring to FIG. 4, in the information on one target household ("target household—001") 400, a monthly power consumption information 410 of one target household and information on owned home appliances 420 included in the one target household may be included.

In the monthly power consumption information 410 of the target household, information on the amount of power used corresponding to each month of a year may be included, and the above may be represented in a graph form 411 on a coordinate plane formed along the temporal axis and the power consumption axis, but is not limited thereto.

The information on owned home appliances 420 of the target household may include information on the home appliances 421 which are registered and managed in the electronic apparatus 100. Here, the information on owned home appliances 420 may include the power consumption information of the home appliances which are registered and managed in the electronic apparatus 100. For example, in the information on owned home appliances 420, a monthly power consumption information of a washer 421 may be included.

Figure 5:
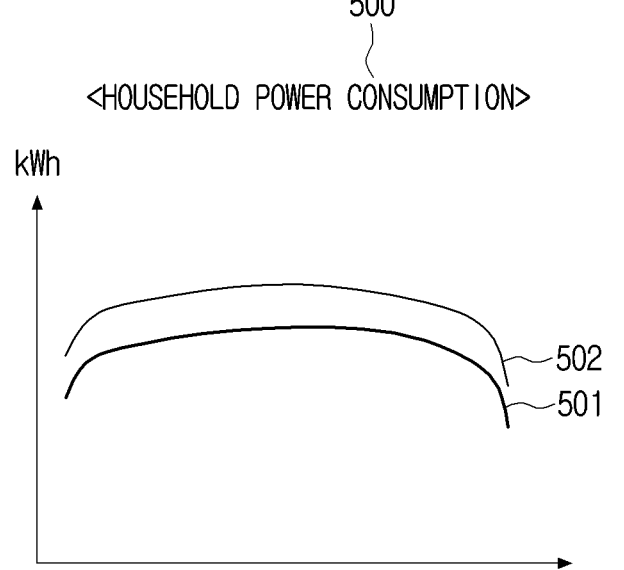
FIG. 5 is a diagram illustrating an operation of comparing power consumptions of a standard household and a target household according to an embodiment of the disclosure.

FIG. 5 is a diagram illustrating an operation of comparing power consumptions of a standard household and a target household according to an embodiment of the disclosure.

Referring to FIG. 5, the processor 120 may identify a standard household with a similar power consumption style with the target household based on monthly power consumption information 500 of the standard household and the target household. Specifically, the processor 120 may identify a standard household with a similar power consumption style as the target household based on whether a difference between the monthly power consumption information of the standard household included in the reference information and the monthly power consumption information of the target household is within the threshold range.

For example, the processor 120 may identify a standard household with a similar power consumption style as the target household based on a similarity of a graph 501 which corresponds to the monthly power consumption of the standard household and a graph 502 which corresponds to the monthly power consumption of the target household. Referencing the graph 501 which corresponds to the monthly power consumption of one standard household and the graph 502 which corresponds to the monthly power consumption of the target household, because both graphs 501 and 502 share the characteristic of amount of power used in summer season being great and amount of power used in winter season being small, the processor 120 may identify the power consumption styles of one standard household and the target household as similar.

However, a method of comparing the monthly power consumptions of the standard household and the target household which is performed by the processor 120 is not limited to the above-described example, and the processor 120 may identify a standard household with similar power consumption style as the target household by comparing the monthly power consumptions of the standard household and the target household based on various methods which are well known or commonly used in the related technical field.

Figure 6:
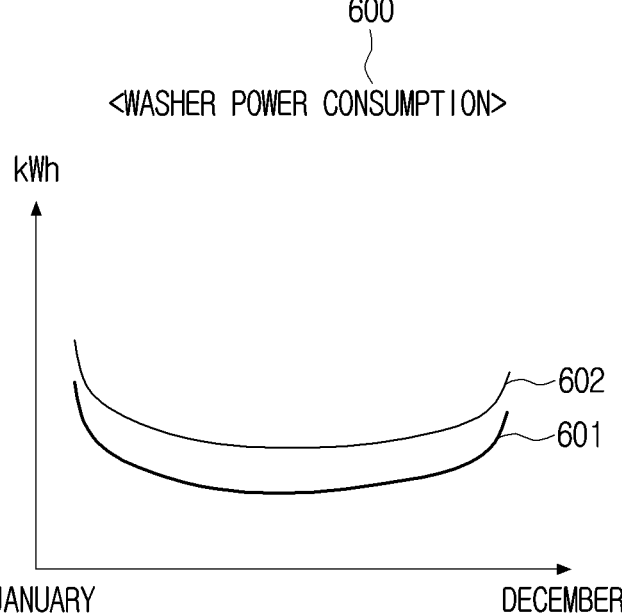
FIG. 6 is a diagram illustrating an operation of comparing power consumptions of home appliances registered in a standard household and a target household according to an embodiment of the disclosure.

FIG. 6 is a diagram illustrating an operation of comparing power consumptions of home appliances registered in a standard household and a target household according to an embodiment of the disclosure.

Referring to FIG. 6, the processor 120, which has identified that the difference between the monthly power consumption information of the standard household included in the reference information and the monthly power consumption information of the target household is within the threshold range, may determine, based on power consumption information 600 of a home appliance (hereinafter, referred to as a "specific home appliance") registered in the electronic apparatus 100 from among the same type home appliances which are all included in the standard household and the target household, whether the power consumption style of the standard household associated with the specific home appliance is similar with the target household.

For example, the processor 120 may identify whether a power consumption style of a washer included in each household is similar based on a similarity of a graph 601 which corresponds to a monthly power consumption of a washer included in a standard household and a graph 602 which corresponds to a monthly power consumption of a washer included in a target household. Because both graphs 601 and 602 share the characteristic of amount of power used in summer season being small and amount of power used in winter season being great, the processor 120 may identify that the power consumption styles of the washer included in one standard household and the target household as similar.

However, the method of comparing the monthly power consumptions associated with the specific home appliance of the standard household and the target household which is performed by the processor 120 is not limited to the above-described example, and the processor 120 may compare the monthly power consumption associated with the specific home appliance of the standard household and the target household based on various methods which are well known or commonly used in the related technical field.

Figure 7:
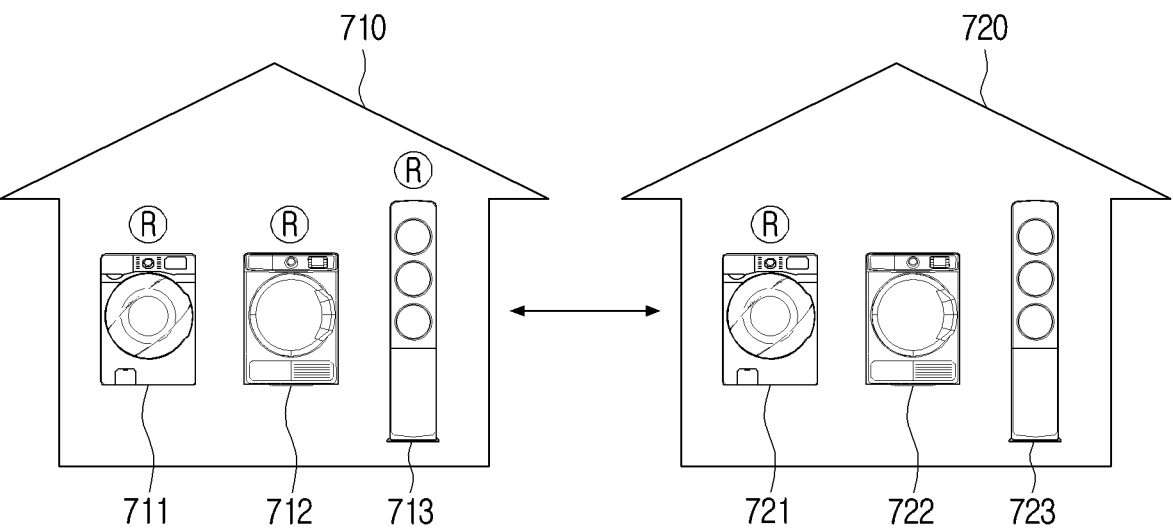
FIG. 7 is a diagram illustrating an operation of predicting information on owned home appliances in a target household according to an embodiment of the disclosure.

FIG. 7 is a diagram illustrating an operation of predicting information on owned home appliances in a target household according to an embodiment of the disclosure.

Based on a standard household 710, in which a power consumption style is identified as similar with a target household 720, being identified as similar with the target household 720, including the power consumption style associated with the specific home appliance, the processor 120 may identify the corresponding standard household 710 as a standard household which matches the target household 720, and predict information on owned home appliances of the target household 720 based on information on owned home appliances of the corresponding standard household 710.

The processor 120 may predict types and number of home appliances included in the target household 720 based on information on owned home appliances associated with home appliances 711, 712, and 713 included in the standard household 710 which is matched with the target household 720.

For example, the processor 120 may predict, based on a washer 711, a dryer 712, and an air conditioner 713 registered in the electronic apparatus 100 being each included respectively in the standard household 710 which is matched to the target household 720, that the dryer 722 and the air conditioner 723, which are unregistered home appliances, are each also respectively included in the target household 720 in addition to the washer 721 registered in the electronic apparatus 100.

In addition, the processor 120 may provide guide information associated with the remaining home appliances 722 and 723, excluding the washer 721 which is registered in the electronic apparatus 100, from among the home appliances predicted as included in the target household 720.

Figure 8A:
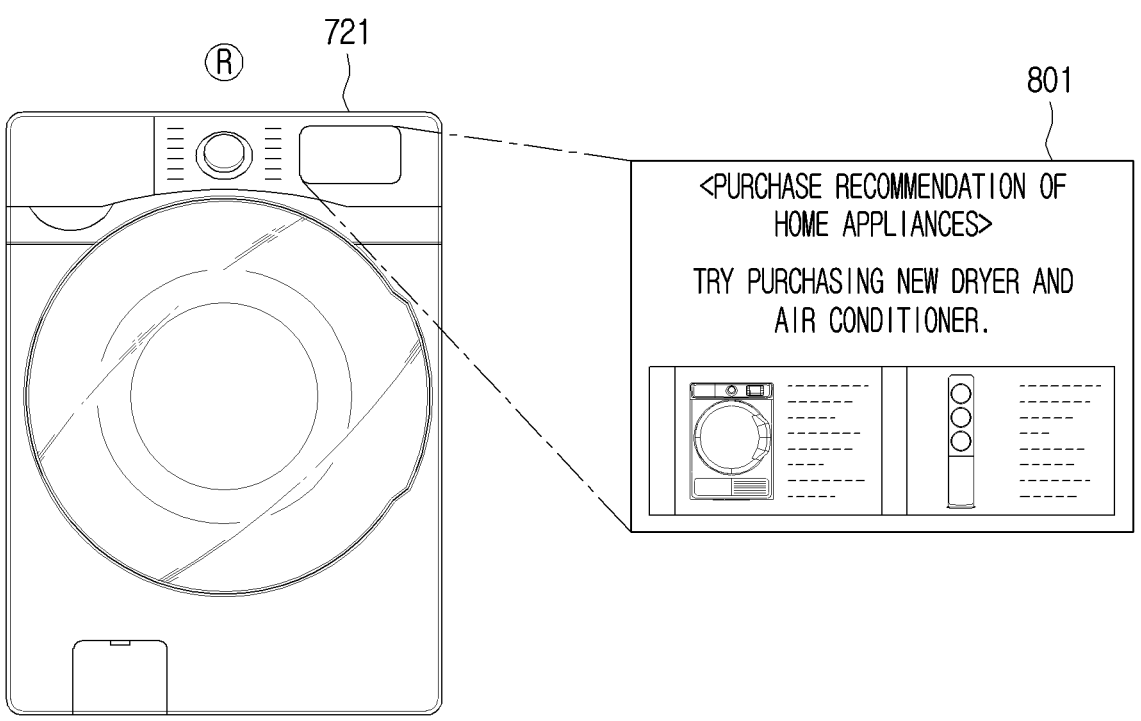
FIG. 8A and FIG. 8B are diagrams illustrating an operation of providing guide information according to an embodiment of the disclosure.
Figure 8B:
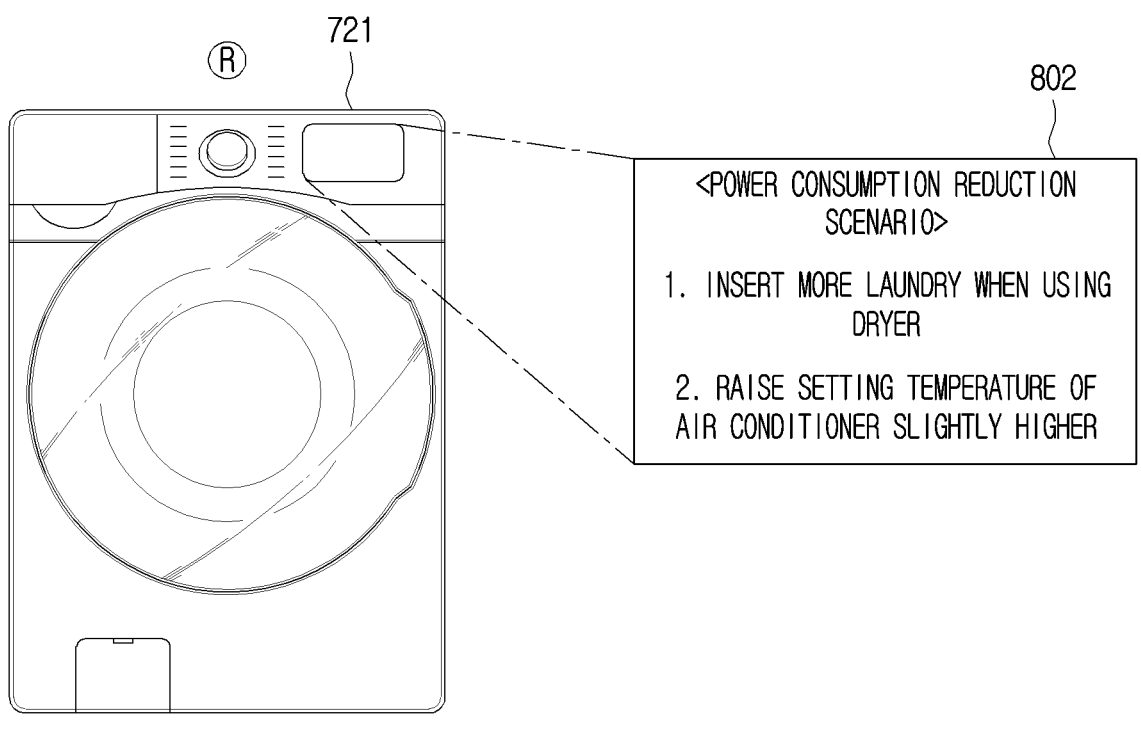

FIG. 8A and FIG. 8B are diagrams illustrating an operation of providing guide information according to an embodiment of the disclosure.

The processor 120 may provide guide information associated with the remaining home appliances which are not registered in the electronic apparatus 100 through the home appliance registered in the electronic apparatus 100 from among the home appliances predicted as included in the target household.

For example, the processor 120 may provide guide information associated with the dryer and the air conditioner which are the remaining home appliances that are not registered in the electronic apparatus 100 through the washer 721 registered in the electronic apparatus 100 from among the home appliances predicted as included in the target household.

Referring to FIG. 8A, the processor 120 may provide purchase recommendation information 801 associated with a dryer and an air conditioner which are not registered in the electronic apparatus 100 through the washer 721 registered in the electronic apparatus 100 from among the home appliances predicted as included in the target household. In the purchase recommendation information 801 according to an example, information associated with at least one from among a dryer or an air conditioner manufactured by an entity (e.g., manufacturer of the home appliance, etc.) using the electronic apparatus 100 may be included, but is not limited thereto.

Referring to FIG. 8B, the processor 120 may provide guide information 802 including a power consumption reduction scenario of the target household through the washer 721 registered in the electronic apparatus 100 from among the home appliances predicted as included in the target household.

In the guide information 802 which includes the power consumption reduction scenario, information associated with use and management of a dryer or an air conditioner which are not registered in the electronic apparatus 100 may be included. For example, the guide information 802 may include a guide instructing to insert more laundry when using the dryer and a guide instructing to raise a setting temperature of the air conditioner, but is not limited thereto.

Figure 9:
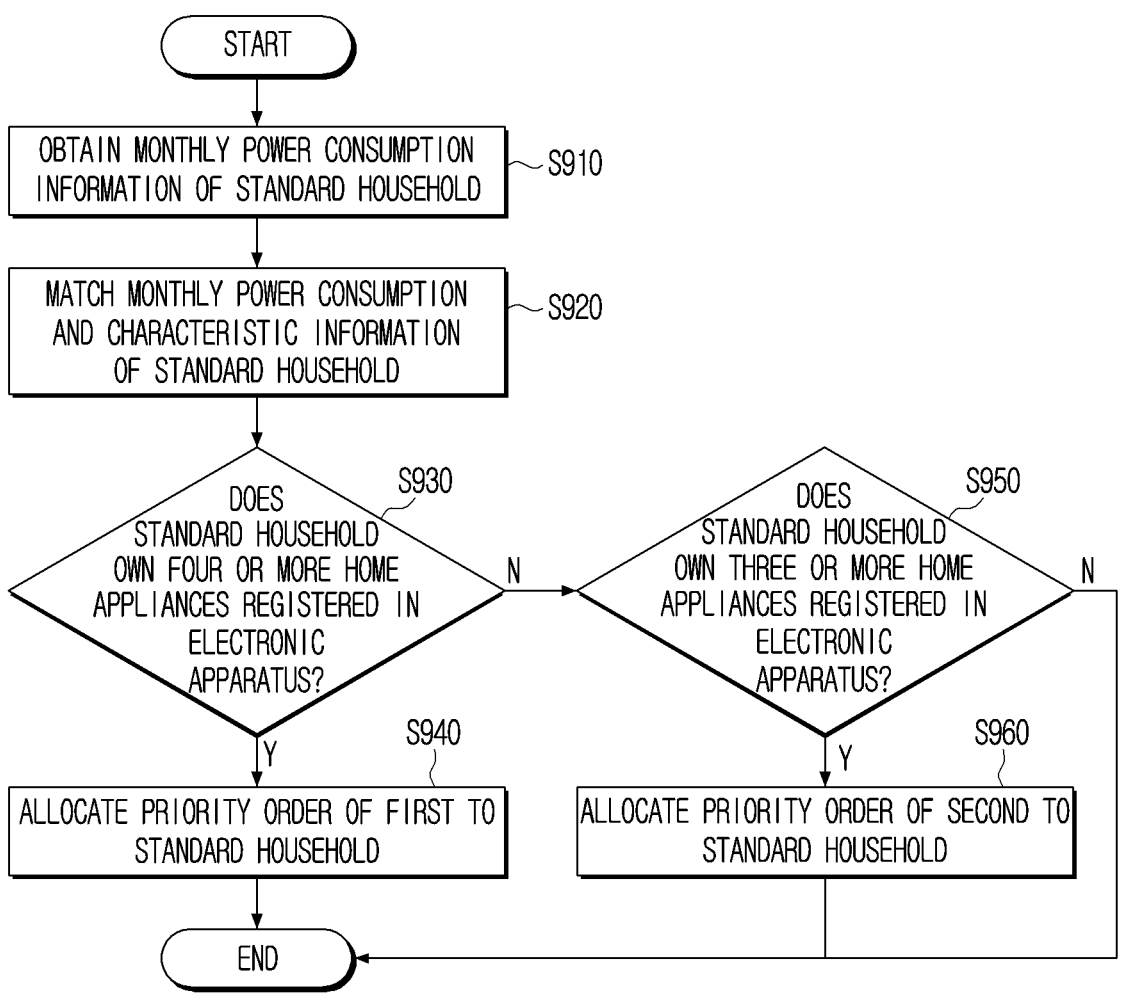
FIG. 9 is a flowchart illustrating an operation of obtaining reference information according to an embodiment of the disclosure.

FIG. 9 is a flowchart illustrating an operation of obtaining reference information according to an embodiment of the disclosure.

First, the processor 120 may obtain monthly power consumption information of a standard household (S910). Here, the monthly power consumption information may include information which corresponds to a total of power consumed in each month by the home appliance included in the standard household and information on power consumed in each month by each of the home appliances registered in the electronic apparatus 100 from among the home appliances included in the standard household, but is not limited thereto.

The processor 120 may then match the obtained monthly power consumption of the standard household and characteristic information of each standard household with each other (S920). Here, the characteristic information may be information which includes at least one from among a number of members in each standard household, a size of a space of the standard household, or a type of the standard household, but is not limited thereto.

The processor 120 may identify whether the standard household owns four or more home appliances registered in the electronic apparatus 100 (S930). Based on the standard household being identified as owning four or more home appliances registered in the electronic apparatus 100 (S930: Y), the processor 120 may allocate a priority order of first to the corresponding standard household (S940).

Based on the standard household being identified as not owning four or more home appliances registered in the electronic apparatus 100 (S930: N), the processor 120 may identify whether the corresponding standard household owns three or more home appliances registered in the electronic apparatus (S950).

Based on the standard household being identified as owning three or more home appliances registered in the electronic apparatus 100 (S950: Y), the processor 120 may allocate a priority order of second to the corresponding standard household (S960).

The processor 120 may include information associated with the standard household allocated with the priority order of first or second in the reference information and store in the memory 110. Based on the standard household being identified as not owning three or more home appliances registered in the electronic apparatus 100 (S950: N), the processor 120 may withdraw status as the standard household which is allocated to the corresponding standard household and exclude the information associated with the corresponding standard household as a whole from reference information.

Figure 10:
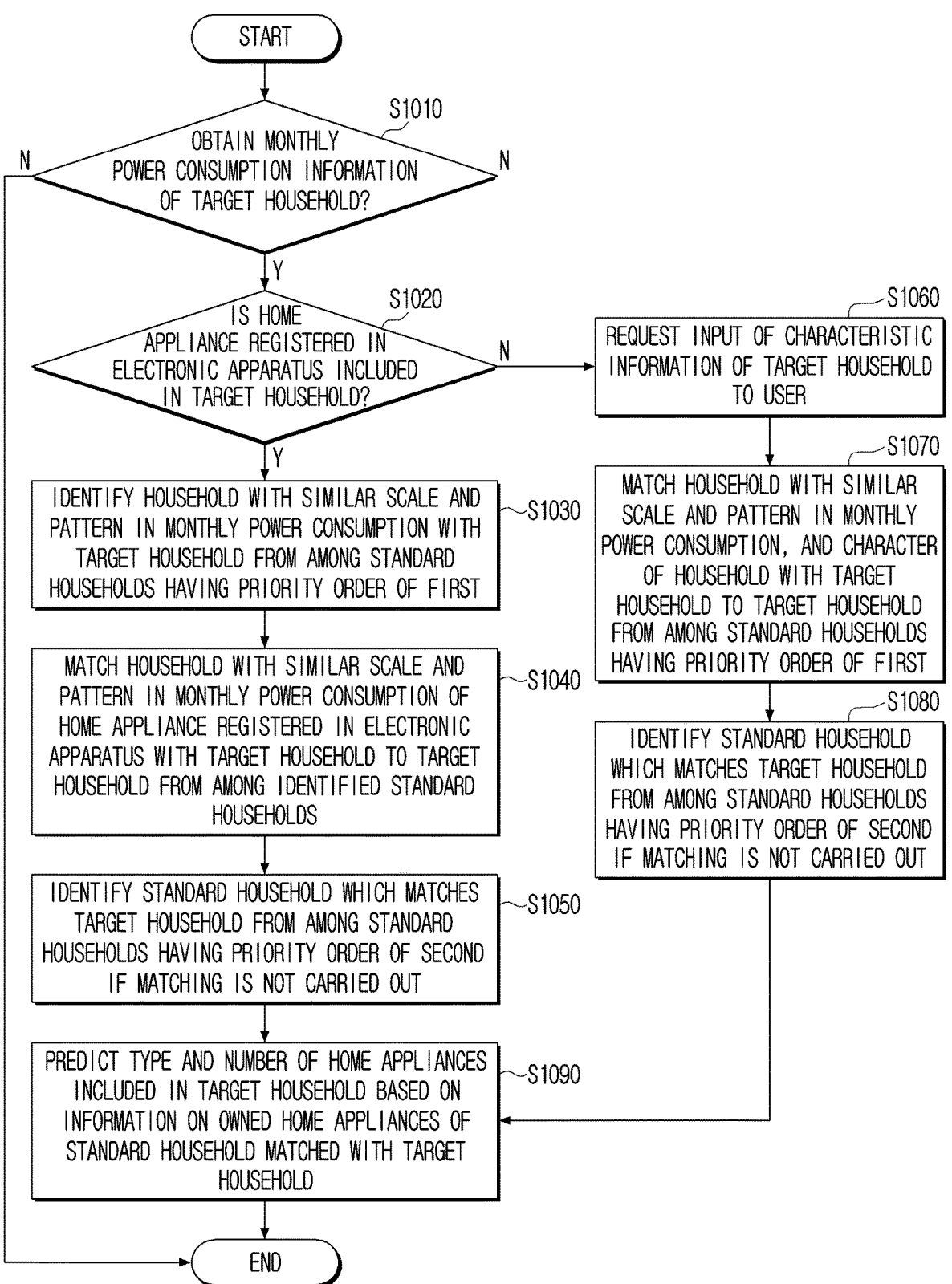
FIG. 10 is a flowchart illustrating an operation of predicting information on owned home appliances in a target household based on whether registered home appliances are included according to an embodiment of the disclosure.

FIG. 10 is a flowchart illustrating an operation of predicting information on owned home appliances in a target household based on whether registered home appliances are included according to an embodiment of the disclosure.

The processor 120 may obtain monthly power consumption information of a target household (S1010). Then, the processor 120 may identify whether a home appliance registered in the electronic apparatus 100 is included in the target household (S1020).

Based on the home appliance registered in the electronic apparatus 100 being identified as included in the target household (S1020: Y), the processor 120 may identify a household with similar scale and pattern in the monthly power consumption as the target household from among the standard households having the priority order of first (S1030).

In addition, the processor 120 may identify the household with the similar scale and pattern in the monthly power consumption of the home appliance registered in the electronic apparatus 100 with the target household as the standard household which matches the target household from among the identified standard households (S1040).

If matching is not carried out, the processor 120 may identify the standard household which matches the target household from among the standard households having the priority order of second (S1050).

Based on the home appliance registered in the electronic apparatus 100 being identified as not included in the target household (S1020: N), the processor 120 may identify the standard household with similar scale and pattern in monthly power consumption, and characteristic information of the household with the target household as the standard household which matches the target household from among the standard households having the priority order of first (S1070).

If matching is not carried out, the processor 120 may identify the standard household which matches the target household from among the standard households having the priority order of second (S1080).

The processor 120 may predict types and number of home appliances included in the target household based on information on owned home appliances of the standard household matched to the target household (S1090).

FIG. 11 is a flowchart illustrating a control method according to an embodiment of the disclosure.

A control method according to an embodiment of the disclosure may include obtaining monthly power consumption information of a first household which owns at least one same type home appliance from among the plurality of home appliances included in information on owned home appliances of the standard household and monthly power consumption information of a home appliance of the same type (S1110).

Then, if the difference between the monthly power consumption information included in the reference information and the monthly power consumption information of the first household is within the threshold range, the monthly power consumption information of the at least one home appliance included in information on owned home appliances of the standard household and the monthly power consumption information of the same type hone appliance included in the first household may be compared (S1120).

If the difference between the monthly power consumption information of at least one home appliance included in information on owned home appliances of the standard household and the monthly power consumption information of the same type home appliance included in the first household is within the threshold range based on a comparison result, information on owned home appliances of the first household may be predicted based on information on owned home appliances of the standard household (S1130).

Lastly, guide information associated with information on owned home appliances may be provided to the first household based on the prediction result (S1140).

Here, in the predicting step (S1130), if the difference between the monthly power consumption information of the at least one home appliance included in information on owned home appliances of the standard household and the monthly power consumption information of the same type home appliance included in the first household is within the threshold range, a type of home appliance owned of the first household may be predicted as same as with a type of home appliance owned of the standard household, and in the step of providing guide information (S1140), guide information associated with the remaining home appliances excluding the same type home appliance included in the first household may be provided.

In addition, the information on owned home appliances of the standard household may include information on home appliances which are registered and managed in the electronic apparatus, and the step of comparing (S1120) may include identifying the priority order of the standard households based on a number of home appliances included in the information on owned home appliances per standard household and comparing the monthly power consumption information of the standard household based on the identified priority order and the monthly power consumption information of the first household.

In addition, the control method may further include identifying the household with owned home appliances of a threshold number or more registered in the electronic apparatus as the standard household.

In addition, the same type home appliance included in the first household may be the home appliance registered in the electronic apparatus, and the step of predicting (S1130) may include obtaining the monthly power consumption information of a second household which does not own home appliances registered in the electronic apparatus and the characteristic information of the household, identifying the standard household which matches the second household from among the standard households based on the monthly power consumption information of the second household and the characteristic information of the household, and predicting information on owned home appliances of the second household based on the information on owned home appliances of the standard household.

Here, the characteristic information of the household may include at least one characteristic from among the number of household members, the size of the household space, or the type of the household.

In addition, the guide information may include at least one from among the purchase recommendation information associated with the remaining home appliances excluding the same type home appliance included in the first household or the power reduction scenario of the first household.

In addition, the obtaining (S1110), the comparing (S1120), and the predicting (S1130) may include obtaining the information on owned home appliances of the first household by inputting the monthly power consumption information of the first household to the trained neural network model.

In addition, in the predicting step (S1130), the information on owned home appliances which includes the types and number of home appliances included in the first household may be predicted based on the information on owned home appliances of the standard household.

Methods according to the various embodiments of the disclosure described above may be implemented in a form or an application installable in an electronic apparatus of the related art.

In addition, the methods according to the various embodiments of the disclosure described above may be implemented with only a software upgrade or a hardware upgrade of the electronic apparatus of the related art.

In addition, the various embodiments of the disclosure may be performed through an embedded processor provided in the electronic apparatus or through at least one external server.

The various embodiments described above may be implemented in a recordable medium which is readable by a computer or a device similar to the computer using a software, a hardware, or a combination of the software and the hardware. In some cases, embodiments described herein may be implemented by the processor 120 itself. According to a software implementation, embodiments such as the procedures and functions described herein may be implemented with separate software modules. Each of the software modules may perform one or more functions and operations described herein.

Computer instructions for performing processing operations in the electronic apparatus 100 according to the various embodiments described above may be stored in a non-transitory computer-readable medium. The computer instructions stored in this non-transitory computer-readable medium may cause a specific device to perform the processing operations in the electronic apparatus 100 according to the above-described various embodiments when executed by the processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:

a non-volatile memory electrically configured to store computer program instructions and reference information, the reference information comprising reference appliance ownership information describing owned home appliances of at least one reference household and reference monthly power consumption information of the at least one reference household; and a processor operatively connected to the non-volatile memory, the processor being configured to execute the computer program instructions to:

obtain first monthly power consumption information of a first household which owns a first home appliance of a same type as at least one reference home appliance from among a plurality of home appliances described in the reference appliance ownership information, identify a priority order of each of the at least one reference household-based on a comparison between a number of the owned home appliances of each of the at least one reference household and a predetermined number of home appliances;

compare, based on the priority order of each of the at least one reference household and a difference between the reference monthly power consumption information and the first monthly power consumption information being within a threshold range, reference appliance monthly power consumption information of the at least one reference home appliance and first appliance monthly power consumption information of the first home appliance, predict, based on the difference between the reference appliance monthly power consumption information and the first appliance monthly power consumption information being within a threshold range, first appliance ownership information on owned home appliances of the first household corresponding to the reference appliance ownership information, and provide guide information associated with the first appliance ownership information to control the owned home appliances of the first household based on a prediction result.

2. The electronic apparatus of claim 1, wherein the processor is further configured to:

predict, based on the difference between the reference appliance monthly power consumption information and the first appliance monthly power consumption information being within the threshold range, a type of the first home appliance and a type of the at least one reference home appliance to be a same type, and provide guide information associated with remaining home appliances excluding the first home appliance.

3. The electronic apparatus of claim 1, wherein the reference appliance ownership information comprises information on home appliances which are registered and managed in the electronic apparatus.

4. The electronic apparatus of claim 1, wherein the processor is further configured to:

identify a reference household of the at least one reference household with owned home appliances of at least a threshold number registered in the electronic apparatus as matching with the first household.

5. The electronic apparatus of claim 1, wherein the first home appliance is a home appliance registered in the electronic apparatus, and the processor is further configured to:

obtain second monthly power consumption information of a second household without an owned home appliance registered in the electronic apparatus, obtain characteristic information of the second household, identify a reference household of the at least one reference household, based on the second monthly power consumption information and the characteristic information of the second household, as matching with the second household, and predict information on owned home appliances of the second household based on the reference appliance ownership information.

6. The electronic apparatus of claim 5, wherein the characteristic information of the second household comprises at least one characteristic from among a number of household members, a size of a household space, and a type of a household.

7. The electronic apparatus of claim 1, wherein the guide information comprises at least one guidance from among purchase recommendation information associated with remaining home appliances excluding the first home appliance and a power reduction scenario of the first household.

8. The electronic apparatus of claim 1, wherein the processor is further configured to:

predict the first appliance ownership information by inputting the first monthly power consumption information to a trained neural network model.

9. The electronic apparatus of claim 1, wherein information on owned home appliances which comprises types and number of home appliances owned by the first household is predicted based on the reference appliance ownership information.

10. A control method of an electronic apparatus which stores reference information comprising reference appliance ownership information describing owned home appliances of at least one reference household and reference monthly power consumption information of the at least one reference household, the control method comprising:

obtaining first monthly power consumption information of a first household which owns a first home appliance of a same type as at least one reference home appliance from among a plurality of home appliances described in the reference appliance ownership information;

identifying a priority order of each of the at least one reference household based on a comparison between a number of the owned home appliances of each of the at least one reference household and a predetermined number of home appliances;

comparing, based on the priority order of each of the at least one reference household and a difference between the reference monthly power consumption information and the first monthly power consumption information being within a threshold range, reference appliance monthly power consumption information of the at least one reference home appliance and first appliance monthly power consumption information of the first home appliance;

predicting, based on the difference between the reference appliance monthly power consumption information and the first appliance monthly power consumption information being within a threshold range, first appliance ownership information on owned home appliances of the first household corresponding to the reference appliance ownership information; and providing guide information associated with the first appliance ownership information to control the owned home appliances of the first household based on a prediction result.

11. The control method of claim 10, wherein the predicting of the first appliance ownership information comprises predicting, based on the difference between the reference appliance monthly power consumption information and the first appliance monthly power consumption information being within the threshold range, a type of the first home appliance and a type of the at least one reference home appliance to be a same type, and wherein the providing of the guide information comprises providing guide information associated with remaining home appliances excluding the first home appliance.

12. The control method of claim 10, wherein the reference appliance ownership information comprises information on home appliances which are registered and managed in the electronic apparatus.

13. The control method of claim 10, further comprising:

identifying a reference household of the at least one reference household with owned home appliances of at least a threshold number registered in the electronic apparatus matching with the first household.

14. The control method of claim 10, wherein the first home appliance is a home appliance registered in the electronic apparatus, and wherein the predicting of the first appliance ownership information comprises:

obtaining second monthly power consumption information of a second household without an owned home appliance registered in the electronic apparatus;

obtaining characteristic information of the second household;

identifying a reference household of the at least one reference household, based on the second monthly power consumption information and the characteristic information of the second household, as matching with the second household; and predicting information on owned home appliances of the second household based on the reference appliance ownership information.

15. The control method of claim 14, wherein the characteristic information of the second household comprises at least one characteristic from among a number of household members, a size of a household space, and a type of a household.

16. The control method of claim 10, wherein the guide information comprises at least one guidance from among purchase recommendation information associated with remaining home appliances excluding the first home appliance and a power reduction scenario of the first household.

17. The control method of claim 10, wherein the predicting of the first appliance ownership information comprises:

predicting the first appliance ownership information by inputting the first monthly power consumption information to a trained neural network model.

18. The control method of claim 10, wherein information on owned home appliances which comprises types and number of home appliances owned by the first household is predicted based on the reference appliance ownership information.

* * * * *